United States Patent Office 3,465,694
Patented Sept. 9, 1969

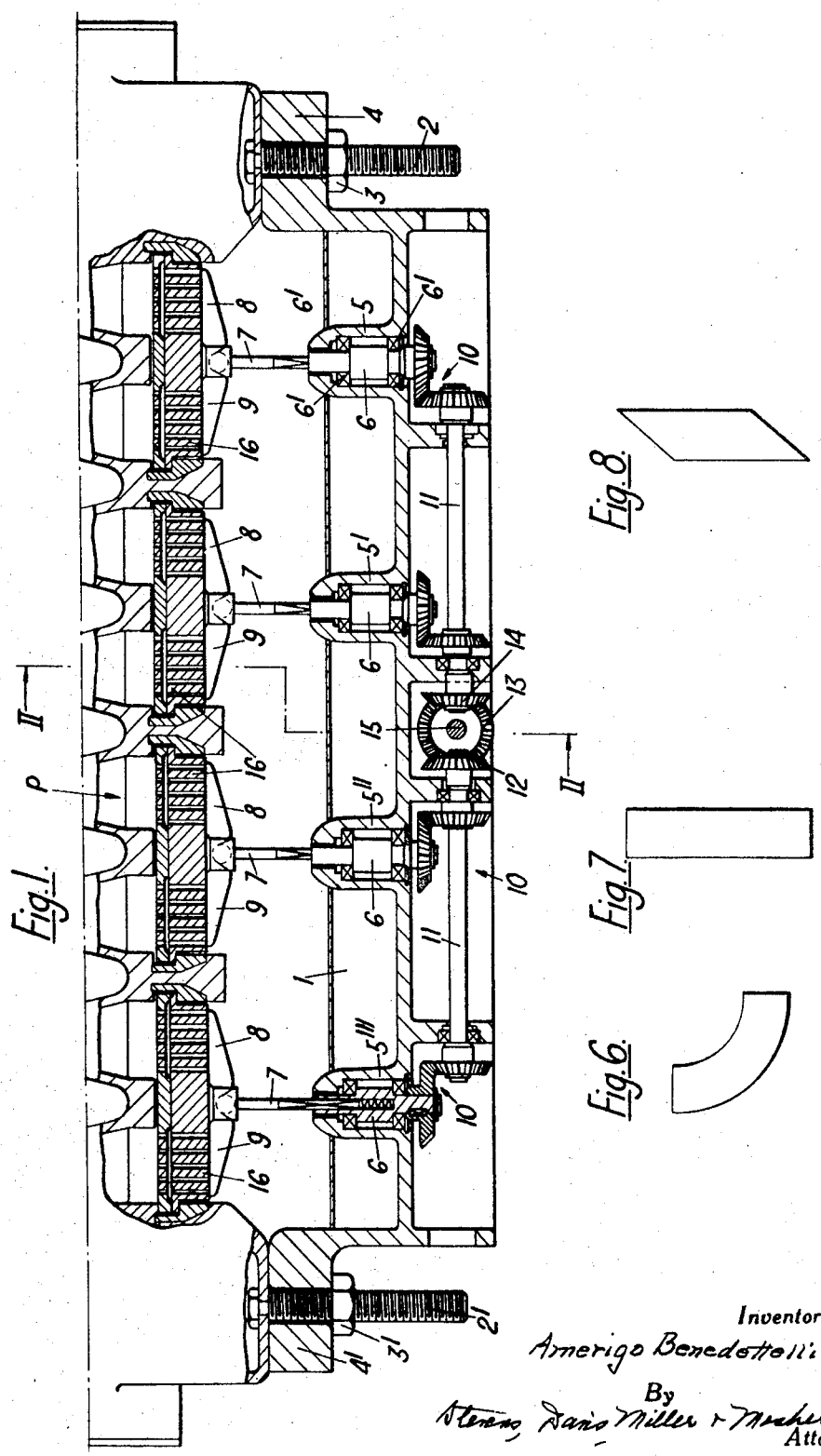

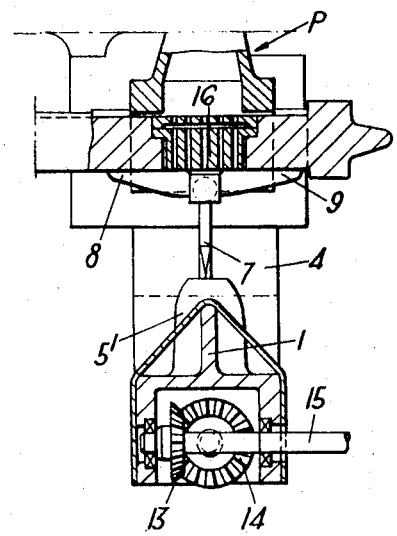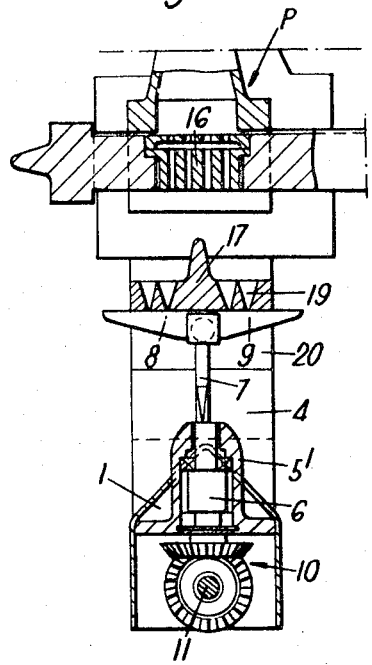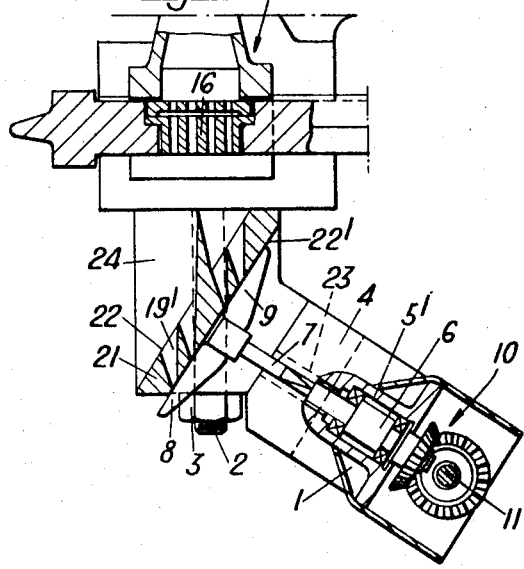

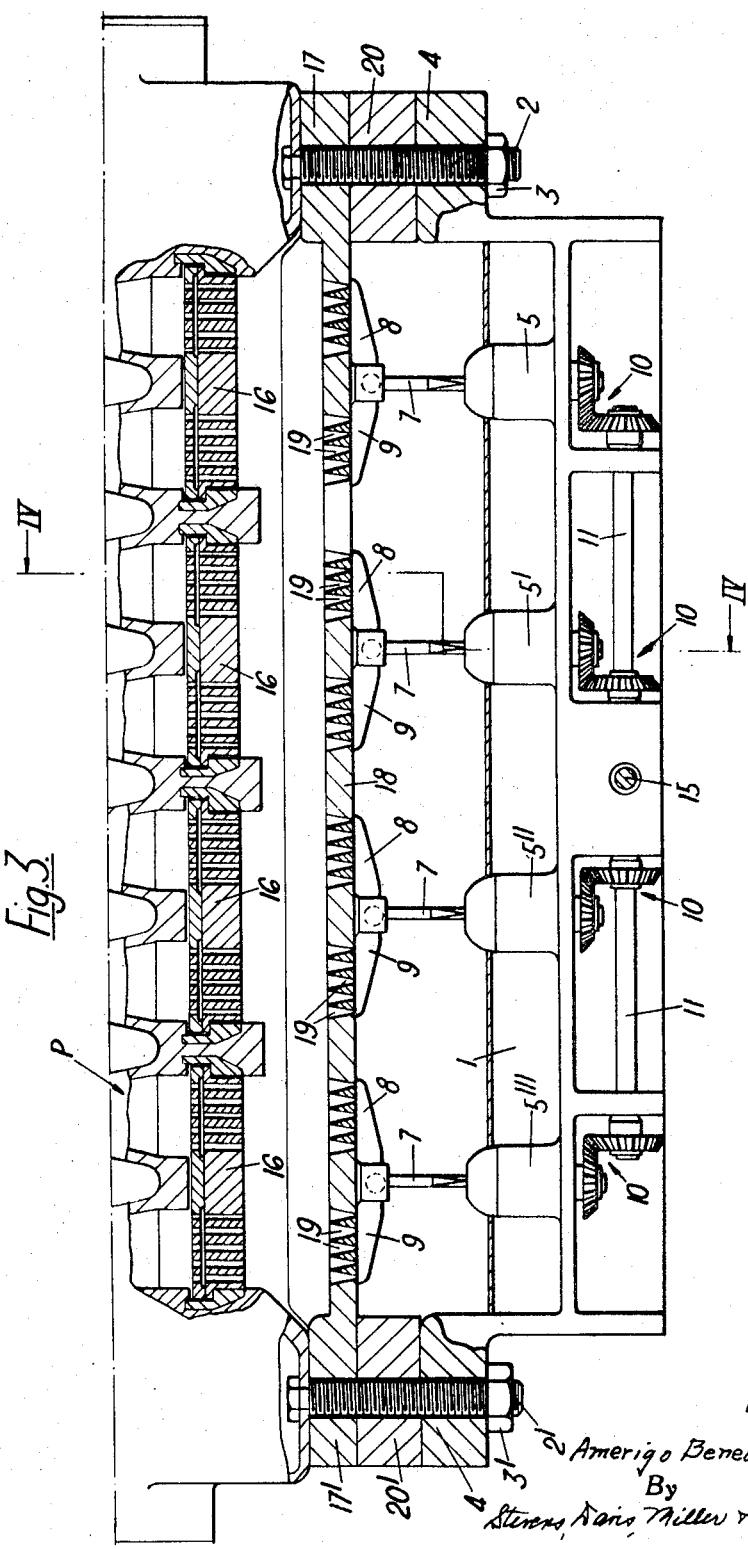

3,465,694
SHORT PASTA CUTTING APPARATUS
Amerigo Benedettelli, Piazza Umberto 8,
Bari, Italy
Filed Mar. 3, 1967, Ser. No. 620,433
Claims priority, application Italy, Mar. 5, 1966,
15,238/66
Int. Cl. A21c 11/10; B26d 3/24
U.S. Cl. 107—69         8 Claims

ABSTRACT OF THE DISCLOSURE

An apparatus for cutting short pasta coming out of the dies of an aligned multiple press machine including knives rotating in the plane of the dies or in the plane of a compensating plate applied to the dies. The knives are mounted on one end of the shafts supported in a member mounted on the machine and are rotated by a transmission shaft also mounted in the member. Bevel gears transmit movement from a driving shaft to the transmission shaft and from the latter to each knife bearing shaft.

---

The shortcomings in the prior art various type short pasta cutting apparatus, relative to pasta multiple press machines, are mainly due to the complicated transmission systems driving the rotating knives positioned below the die, the systems nearly always including universal joints.

An object of the invention is to simultaneously simplify and unify the driving system of the knives supported and rotated in a plane which always remains parallel to the die plane or to the compensating plate plane placed between the die and the knives.

Another object of the invention is to provide the possibility of using the same knife assembly even when it is desired to pass from straight pasta cutting to biased cutting (penne) without using knives working over conical surfaces as in the prior art machines.

The apparatus of this invention includes a cutting device made up by a series of knives rotating in a common plane and operated by a series of parallel shafts whose respective axes lie in a single plane perpendicular to the cutting plane in which said knives rotate; said shafts being supported by a supporting structural member detachably mounted on the machine frame, and deriving their rotating movement through simple bevel gear couples, from a single longitudinal transmission shaft with its axis lying on the plane relative to the axes of the knife shafts and supported by said supporting member and rotated by a single drive.

The improved cutting device used for producing curved short pasta when positioned, with the knives making a direct contact wtih the dies, may as well be used for producing straight short pasta when the per se known compensating plate is inserted between the knives and the dies and when the knives are operated in contact with said plate exit lower face, said plate being parallel to the die plane.

In addition, the cutting device of the invention may be used for producing biased cut short pasta (penne) by substituting a spacer plate with inclined faces as compared to the die plane but with its holes axially aligned with those of the dies, to the compensating plate having its faces parallel to the die plane, and having the knives operating in contact with said plate exit inclined face.

These and other objects and features of the apparatus of this invention will become apparent in consideration of the possible embodiments illustrated, by way of example, in the following drawings, in which:

FIG. 1 is a fragmentary elevation partially in section, of the cutting apparatus as applied to a multiple press machine for curved short pasta production;

FIG. 2 illustrates a sectional view of the same apparatus taken along line II—II of FIG. 1;

FIG. 3 illustrates the apparatus as in FIG. 1, but positioned for straight short pasta cutting;

FIG. 4 shows a sectional view taken along line IV—IV of FIG. 3;

FIG. 5 illustrates the apparatus in a sectional view similar to that of FIGS. 2 to 4, positioned for biased short pasta (penne) cutting; and FIGS. 6, 7, 8 respectively illustrate the different types of curved, straight and biased short pasta that can be produced by means of said apparatus.

The apparatus illustrated in the figures includes said cutting device consisting of a member 1 having substantially an upside down T shape. The member is positioned by simply letting its heads 4, 4' slide on the studs 2, 2' fixed to the ends of the multiple press machine P, and then blocking the assembly by means of nuts 3, 3'.

Member 1 is equipped with supporting boxes 5, 5', 5'', 5'''. Each box accommodates sleeve 6 rotating around its axis on bearings 6', the sleeve transmitting rotational movement to shafts 7 on the free ends of which knives 8, 9 are articulated. Sleeves 6 are driven through bevel gear couples 10, by a single central shaft 11 made in the shown embodiment in two pieces. Shaft 11 can rotate on bearings 11' and is positioned in the lower section of member 1, and is in turn rotated through bevel gears 12, 13, 14 by a driving shaft 15.

In the case illustrated each knife pair 8, 9 serves a die 16 including two coupled dies relative to two adjacent presses.

With the cutting device positioned as in FIG. 1, knives 8, 9 rotate in the plane contacting the dies 16 of the multiple press machine P. This way a curved pasta production (FIG. 6) is obtained. This is due to the fact that from the beginning to the end of each pasta yarn cutting operation, said pasta continues coming out from the section not yet reached by the knife and becomes longer and curved in comparison to the section already cut by the knife because of the heavy pressure the pasta has to withstand.

When a straight short pasta production is desired, it is necessary to eliminate the presure effect during the cutting step. To this end, once nuts 3, 3' have been removed member 1 together with the cutting assembly is slid off and the compensating plate heads 17, 17' are slid into position on studs 2, 2'. Tapered holes 19 are cut into the compensating plate, and all the pasta yarns coming out from the die, being relieved from the pressure, pass through them. The cutting assembly is mounted below said plate. This is accomplished by mounting in position the two heads 4, 4' on said studs 2, 2' provided spacers 20, 20' are placed between said device and the compensating plate, so that the knives rotate in contact with the lower face of the compensating plate 18. With such an arrangement since the knives rotate in a plane parallel to the die plane, straight short pasta is produced, as shown in FIG. 7.

On the other hand a biased cut pasta is obtained if the just described bored out plate 18, having the two lower and upper faces parallel to the dies and perpendicular to the axes of bores 19, is substituted by a compensating plate 21 (FIG. 5) having holes 19' in axial alignment with the die openings and faces 22, 22' biased with respect to the die plane, and if the same cutting device is mounted so that the knives rotate in the plane and in contact with the biased face 22'.

In order to accomplish bias cutting, it is necessary to position the cutting device heads 24 relative to plate 21.

The plate 21 provided with two projecting studs 23 which are perpendicular to the face 22' of the plate. The cutting device heads 4 and 4' are mounted on the studs 23 so that the knife shafts are positioned perpendicular to the knives 8, 9 and in working contact with the face 22'.

What is claimed is:

1. An apparatus for cutting short pasta of any shape coming from dies of an aligned multiple press machine, the apparatus comprising a cutting assembly including a support member detachably mountable on a multiple press machine, a plurality of bearing supports in said member, knife shafts rotatably mounted in said bearing supports with their axes parallel to each other in a single plane, a plurality of knives rotatably mounted on the free ends of said shafts, said knives being driven by said shafts to rotate in a plane perpendicular to said shaft axes, a transmission shaft means rotatably mounted in said support member, bevel gear means for transmitting the rotational movement of said transmission shaft to said knife shafts, and a driving shaft operatively connected to rotate said transmission shaft, said bearing supports, knife shafts, knives, transmission shaft means and bevel gear means all being mounted in said support member and thereby constituting a unitary cutting assembly therewith, said assembly being demountably attachable as a unit to a multiple press machine with said knives being arranged at either of various distances from the dies and to rotate in planes at either of various angles relative to the die axes in order to cut pasta as it emerges from the dies of the machine in either of various forms.

2. An apparatus for cutting short pasta according to claim 1 in which said support member includes head portions at each end thereof, holes in said head portions for receiving therein means to mount said member on a multiple press machine.

3. An apparatus according to claim 1 further comprising at least one compensating plate detachably mountable on a multiple press machine between said machine and said cutting assembly, and spacer means for spacing said compensating plate from said cutting assembly.

4. An apparatus according to claim 3 in which said compensating plate includes mounting means for allowing the cutting assembly to be attached to the machine frame through said plate.

5. An apparatus according to claim 4 in which said mounting means includes studs the free ends of which project from said compensating plate to receive the cutting assembly thereon.

6. An apparatus according to claim 3 in which each said compensating plate is provided with openings admitting the strands of pasta emerging from said dies and inclined surfaces coacting with the cutting assembly to sever the strands, the knife shafts being perpendicular to and the knives contacting said inclined surfaces.

7. The apparatus of claim 1, wherein said assembly is mountable upon a multiple press machine with said knives rotatable in a common plane with the outer faces of the dies whereby the knives slide along said outer faces and thereby produce curved short pasta.

8. The apparatus of claim 1, including a compensating plate mountable upon said machine in a plane parallel to and spaced away from the machine dies, said plate including through openings for pasta from said dies to pass therethrough, said cutting assembly being mountable on said machine outwardly of said plate with said knives being positioned to rotate in contact with the face of said plate at the outlet side of said openings so as to produce straight short pasta.

References Cited

UNITED STATES PATENTS

| | | |
|---|---|---|
| 1,426,244 | 8/1922 | Barducci. |
| 2,103,310 | 12/1937 | Ambrette. |
| 3,143,766 | 8/1964 | Rohn _____ 83—355 X |
| 1,487,323 | 3/1924 | Fontana. |
| 2,149,920 | 3/1939 | Kretchmer. |
| 2,825,292 | 3/1958 | Benedettelli. |
| 3,315,620 | 4/1967 | Bontempi _____ 107—54 X |

WALTER A. SCHEEL, Primary Examiner

J. SHEA, Assistant Examiner

U.S. Cl. X.R.

18—12; 83—355, 591